United States Patent
Sundararaj et al.

(10) Patent No.: US 9,584,017 B1
(45) Date of Patent: Feb. 28, 2017

(54) INPUT AND OUTPUT OVERVOLTAGE PROTECTION IN A POWER CONVERTER

(71) Applicant: Power Integrations, Inc., San Jose, CA (US)

(72) Inventors: Sundaresan Sundararaj, Union City, CA (US); Zongqi Hu, Fremont, CA (US); Tiziano Pastore, Los Gatos, CA (US); Yury Gaknoki, San Jose, CA (US); Arthur B. Odell, Morgan Hill, CA (US)

(73) Assignee: Power Integrations, Inc., San Jose, CA (US)

( * ) Notice: Subject to any disclaimer, the term of this patent is extended or adjusted under 35 U.S.C. 154(b) by 4 days.

(21) Appl. No.: 14/846,313

(22) Filed: Sep. 4, 2015

(51) Int. Cl.
*H02M 3/157* (2006.01)

(52) U.S. Cl.
CPC .................. *H02M 3/157* (2013.01)

(58) Field of Classification Search
CPC .... H02M 3/156–3/158; H02M 3/1584; H02M 3/1588; H02M 2001/0032; Y02B 70/1466; G05F 1/46; G05F 1/51; G05F 1/63
USPC .......................... 323/222, 235, 271, 282–284
See application file for complete search history.

(56) References Cited

U.S. PATENT DOCUMENTS

| 7,339,359 B2* | 3/2008 | Choi ................. | H02M 3/33523 323/284 |
| 9,048,752 B2* | 6/2015 | Capilla .............. | H02M 1/4225 |
| 2016/0134187 A1* | 5/2016 | Pregitzer ............ | H02M 3/156 323/285 |

OTHER PUBLICATIONS

International Rectifier, LEDrivIR™: Part No. IRS2983IPBF, "LED Flyback Control IC", © 2014 International Rectifier, Sep. 10, 2014, 17 pages.

\* cited by examiner

*Primary Examiner* — Yemane Mehari
(74) *Attorney, Agent, or Firm* — Blakely Sokoloff Taylor & Zafman LLP

(57) ABSTRACT

A controller for use in a power converter includes a gate drive circuit coupled to generate a control signal to switch a power switch of the power converter. A zero current detection circuit is coupled to a multifunction pin coupled to receive a multifunction signal that is representative of an input voltage of the power converter when the power switch is on, and representative of an output voltage of the power converter when the power switch is off. The zero current detection circuit is coupled to generate a zero current detection signal. An overvoltage detection circuit is coupled to receive the multifunction signal and a state signal representative of a state of the power switch to generate in response to the state signal and the multifunction signal a line overvoltage signal and an output over voltage signal coupled to be received by the gate drive circuit.

20 Claims, 8 Drawing Sheets

INPUT AND OUTPUT OVERVOLTAGE PROTECTION IN A POWER CONVERTER

BACKGROUND INFORMATION

Field of the Disclosure

The present invention relates generally to power converters, and more specifically controllers that can detect an input and output of a power converter from a single pin.

Background

Electronic devices use power to operate. Switched mode power converters are commonly used due to their high efficiency, small size and low weight to power many of today's electronics. Conventional wall sockets provide a high voltage alternating current. In a switch mode power converter, a high voltage alternating current (ac) input is converted to provide a well-regulated direct current (dc) output through an energy transfer element. The switched mode power converter control circuit usually provides output regulation by sensing one or more inputs representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

Power converters are occasionally exposed to surges in the received input voltage, which is generally referred to as an overvoltage condition. Input and output overvoltages can be dangerous in power supplies: input voltages going too high may cause high voltage (HV) switches to fail due to high voltage and high current conditions occurring at the same time, with the switch failing even below its breakdown voltage. Excessive output voltage may cause electrical overstress on the output capacitors, electrolytic in most cases, which may cause it to fail causing fire or other hazards. Furthermore, light emitting diode (LED) bulb manufacturers sometimes perform production tests with the LED load disconnected. In this situation, the bulb (with its driver circuitry) should survive and not degrade lifetime expectations. In this case, it's crucial to minimize stress on output electrolytic capacitor.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
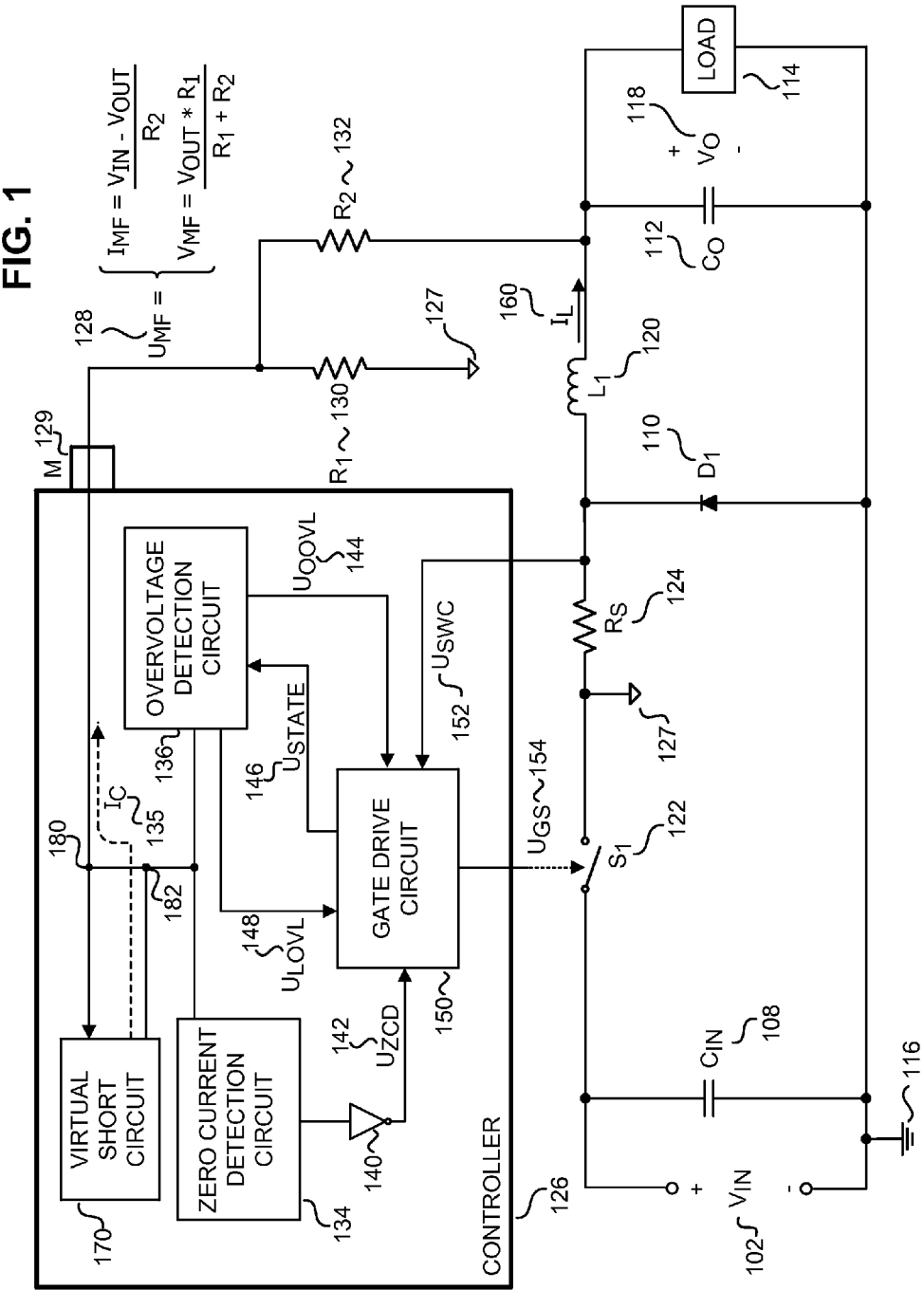
FIG. 1 is a block diagram illustrating one example of a power converter, in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of power converters in which the inputs and outputs are protected from overvoltage conditions are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Referring to FIG. 1, a functional block diagram of an example power converter 100 is illustrated in accordance with the teachings of the present invention. In the depicted example, power converter 100 is implemented as a buck converter, which includes an input filter capacitor $C_{IN}$ 108 coupled to a rectified input voltage $V_{IN}$ 102, a high side switch S1 122, a controller 126, a sense resistor Rs 124, a resistor R1 130, a resistor R2 132, a rectifier D1 110, an energy transfer element L1 120, which is coupled between the input and the output of the power converter 100, an output capacitor Co 112, a load 114, an input return 116, and a local return 127 as shown. It is appreciated that the high side switch S1 122, which is coupled to the input of the power converter and to the energy transfer element L1 120, may also be referred to as a power switch, or a main switch. In one example, controller 126 further includes a multifunction M pin 129, a zero current detection circuit 134, an inverter 140, an overvoltage detection circuit 136, a gate drive circuit 150, virtual short circuit 170, and nodes 180, 182.

FIG. 1 further illustrates an example in which energy transfer element current $I_L$ 160 is implemented with an inductor, and multifunction M pin 129 coupled to receive a multifunction signal $U_{MF}$ 128. As shown in the example, multifunction signal $U_{MF}$ 128 is coupled to be received through a resistor R2 132. In the depicted example, one end of resistor R2 132 is coupled to multifunction M pin 129, and a second end of resistor R2 132 coupled to be responsive to an output of power converter 100 as shown. In addition, a resistor R1 130 is coupled between multifunction M pin 129 and the local return 127 as shown. Controller 126 further includes a switch current signal $U_{SWC}$ 152, an output overvoltage signal $U_{OOVL}$ 144, a state signal $U_{STATE}$ 146, a line overvoltage signal $U_{LOVL}$ 148, a zero current detection signal $U_{ZCD}$ 142, and a control signal $U_{GS}$ 154.

Power converter 100 may further include a high side positive rail and low side negative rail coupled to receive rectified voltage $V_{IN}$ 102. In one example, input filter capacitor $C_{IN}$ 108 may be included to provide a switching noise filtering function. For power converters with power factor correction (PFC), a small input filter capacitor $C_{IN}$ 108 may be coupled between the high side positive rail and low side negative rail to allow the filtered voltage to substantially follow the rectified input voltage. In other words, the capacitance of input filter may be selected such that when the rectified input voltage $V_{IN}$ 102 substantially reaches zero, the voltage on the input filter capacitor $C_{IN}$ 108 may also substantially reach zero.

Power converter 100 may further include controller 126 coupled to control switch S1 122 via control signal $U_{GS}$ 154 to control a transfer of energy from the input of power converter 100 to the output of power converter 100 through energy transfer element L1 120. In the example depicted in FIG. 1, the input of power converter 100 is coupled to receive input voltage $V_{IN}$ 102, and load 114 is coupled to the output of power converter 100 to receive output voltage $V_O$ 118. Controller 126 may be located on the high side positive rail and may be coupled to multifunction signal $U_{MF}$ 128 through multifunction M pin 129. In some examples, multifunction signal $U_{MF}$ 128 may be representative of output voltage $V_O$ 118, when switch S1 122 is open. Multifunction signal $U_{MF}$ 128 may also be representative of the input voltage $V_{IN}$ 102, when switch S1 122 is closed. More discussion on how multifunction signal $U_{MF}$ 128 can sense an input voltage or an output voltage will be discussed in FIG. 2A and FIG. 2B.

In one example, current sense resistor $R_S$ 124 is coupled to one end of the switch S1 122, and another end is coupled to a cathode side of diode D1 110. The current sense resistor RS 124 provides a switch current signal $U_{SWC}$ 152 to the controller 126. In the depicted example, the switch current signal $U_{SWC}$ 152 provides a signal value representative of the current in switch S1 122.

In one example, controller 126 is coupled to generate control signal $U_{GS}$ 154 to control switching of switch S1 122 between an on state (e.g., a state in which current is substantially allowed to flow through switch S1 122) and an off state (e.g., a state in which current is substantially prevented from flowing through switch S1 122) in response to control signal $U_{GS}$ 154. Controller 126 may disable switching of switch S1 122 when an output overvoltage occurs, a line overvoltage occurs, or both occur, in accordance with the teachings of the present invention.

In operation, when switch S1 122 is turned on, current may flow into inductor L1 120, thereby charging output capacitor Co 112. The voltage across the inductor L1 120 is proportional to $V_{IN}$-$V_O$, and the current flowing out of the multifunction M pin 129. In one example, controller 126 creates a virtual short between the multifunction M pin 129 and the end of switch S1 122 that is directly coupled to local return 127. To illustrate, the example depicted in FIG. 1 shows that controller 126 includes a virtual short circuit 170 coupled to multifunction M pin 129. In the example, that virtual short circuit 170 is coupled to provide a current when the voltage at the multifunction M pin 129 decreases to a negative value. The offset current provided by the virtual short circuit 170 takes a path from node 182 to node 180. The offset current $I_C$ 135 is provided by the virtual short circuit 170 to the M pin 129 increases the voltage at M pin 128 back to zero, thus creating a virtual short between the multifunction M pin 129 and the end of switch S1 122 that is directly coupled to local return 127. With the virtual short between multifunction M pin 129 and local return 127, a current $I_{MF}$ can be derived for the $U_{MF}$ signal 128 as $$I_{MF} = \frac{V_{IN} - V_O}{R_2}. \tag{1}$$

When switch S1 is closed, controller 126 may be able to detect when a line overvoltage condition occurs if $I_{MF}$ exceeds a threshold value. In one example, the threshold value may be 1 milliamp. If a line overvoltage is detected, controller 126 may disable switching and perform an auto-restart.

In operation, when switch S1 122 is open, current flows through the inductor L1 120, output capacitor Co 112 and load 114. The current then returns through rectifier D1 110, thereby ramping down while energy in inductor L1 120 discharges. During the flywheel conduction time, the output voltage measured by $V_{MF}$ can be expressed for the $U_{MF}$ signal 128 as $$V_{MF} = \frac{V_{OUT} * R_1}{R_1 + R_2}. \tag{2}$$

An output overvoltage condition may have occurred if multifunction signal $U_{MF\_}$ 128 exceeds a threshold value. If an output overvoltage is detected for several consecutive cycles, controller 126 may disable switching and perform an auto-restart. For instance, in one example, if an overvoltage is detected for four consecutive switching cycles, then controller 126 may disable switching and perform the auto-restart. In one example, the output voltage threshold value may be 2.4 volts. In one example, the value of R2 may be 400 kΩ. In one example the value of R1 is fifteen times less than R2, which in this example is equivalent to 26.67 kΩ.

The multifunction signal $U_{MF}$ 128 may provide a signal to controller 126 for when the switch S1 122 needs to be turned on or off. In one example, controller 126 includes a zero current detection circuit 134 coupled to receive the multifunction signal $U_{MF}$ 128. In one example, the zero current detection circuit 134 of controller 126 is coupled to detect when inductor L1 160 is about to be demagnetized. A negative edge triggered zero current detection signal $U_{ZCD}$ 142 is provided to the gate drive circuit 150 for switching of S1 122 to occur.

Figure 2A:
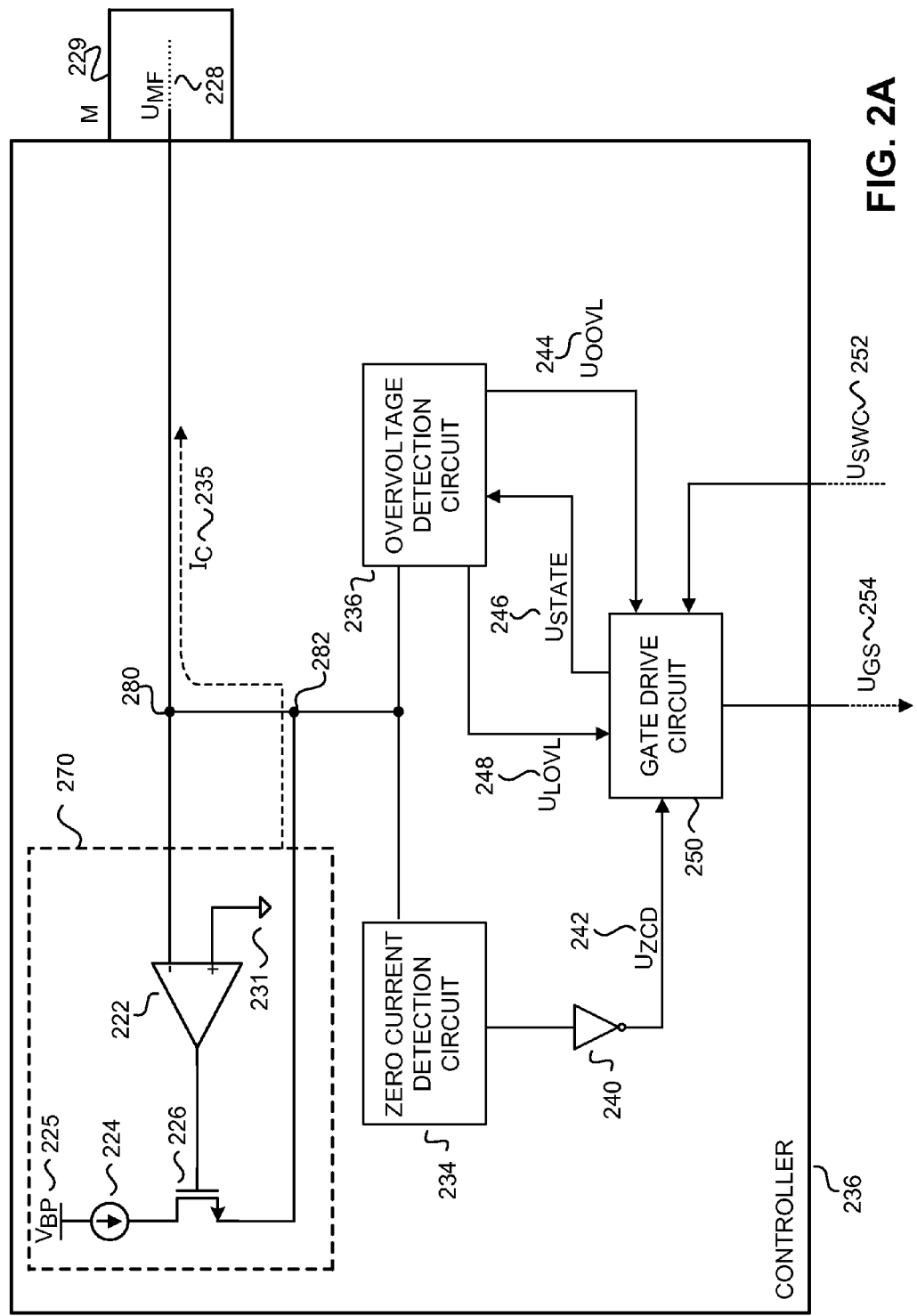
FIG. 2A is a block diagram of one example of a controller for a power converter illustrating a detailed example of a virtual short circuit, in accordance with the teachings of the present disclosure.

FIG. 2A illustrates an example of a controller 236, which is similar to controller 126 as shown in FIG. 1, and further illustrating the virtual short circuit 270 included therein. As shown in the depicted example, controller 236 includes of a zero current detection circuit 234, an overvoltage detection circuit 236, an inverter 240, a gate drive circuit 250, virtual short circuit 270, and nodes 280, 282. Controller 236 also includes a multifunction M pin 229, which is coupled to receive a multifunction signal $U_{MF}$ 228.

As shown in the depicted example, virtual short circuit 270 includes a ground sense amplifier 222, a current source 224 coupled to a supply voltage $V_{BP}$ 225, and a transistor 226. In one example, the supply voltage $V_{BP}$ 225 may be connected to a bypass pin of controller 236. Ground sense amplifier 222 is coupled to receive the $U_{MF}$ signal 228 at the inverting input terminal and a ground reference 231 is coupled to the non-inverting input terminal. As such, when the $U_{MF}$ signal 228 drops to a negative value, ground sense amplifier 222 turns on transistor 226. Transistor 226 delivers an offset current $I_C$ 235 from current source 224. The offset current takes the path from node 282 to node 280. The offset current $I_C$ 235 brings the voltage at multifunction M pin 229 back to zero.

Figure 2B:
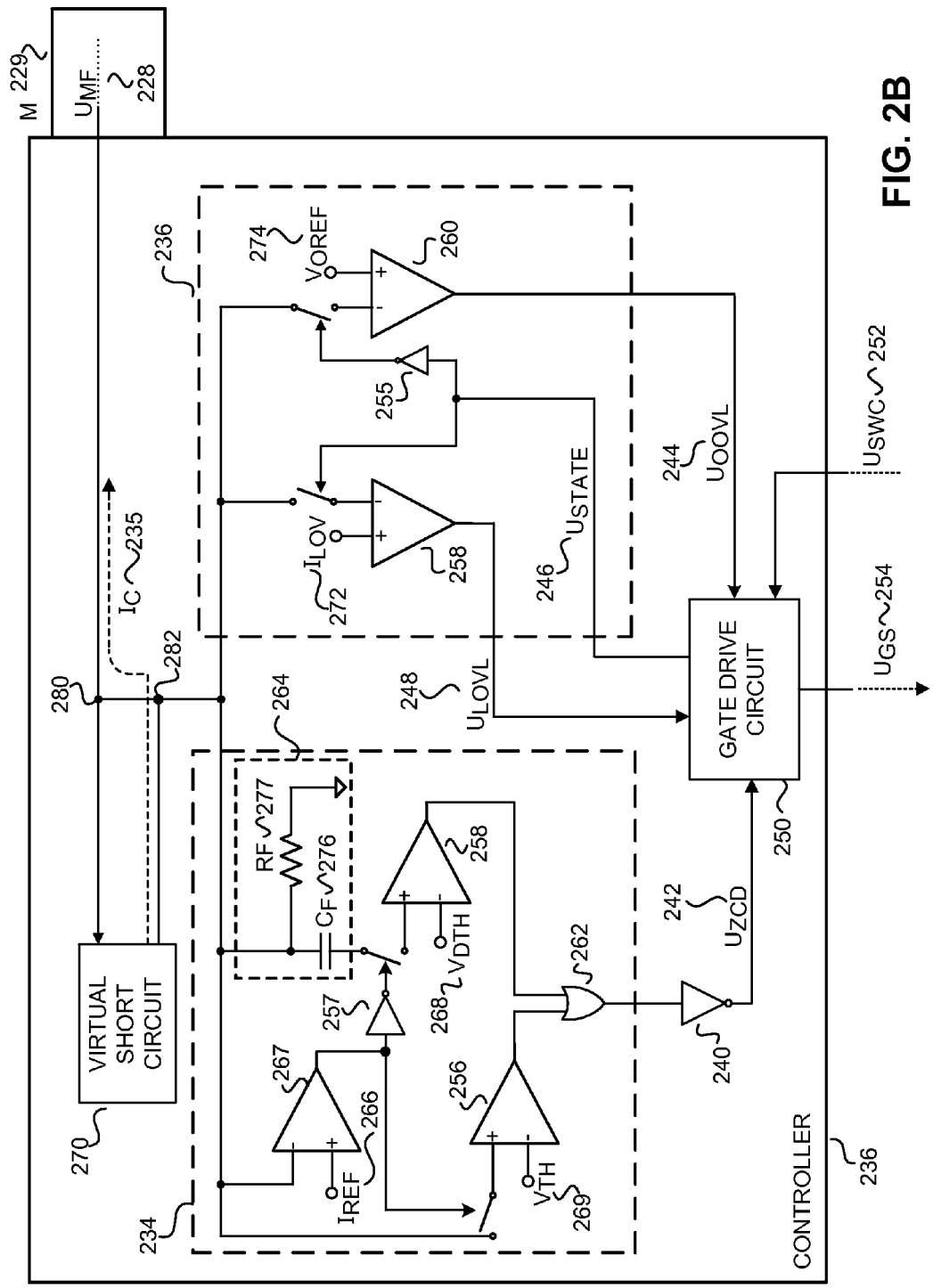
FIG. 2B is a block diagram of one example of a controller for a power converter illustrating detailed examples of an overvoltage detection circuit and a zero current detection circuit, in accordance with the teachings of the present disclosure.

FIG. 2B illustrates an example of controller 236, which is also similar for example to controller 126 as shown in FIG. 1, and illustrates increased detailed examples of a zero current detection circuit 234, and an overvoltage detection circuit 236. As shown in the depicted example, controller 236 includes a zero current detection circuit 234, an overvoltage detection circuit 236, an inverter 240, a gate drive circuit 250, virtual short circuit 270, and nodes 280, 282. Gate drive circuit 250 is coupled to receive a zero current signal $U_{ZCD}$ 242, a switch current signal $U_{SWC}$ 252, a line overvoltage signal $U_{LOVL}$ 248, and an output overvoltage signal $U_{OOVL}$ 244. Gate drive circuit 250 is coupled to output the control signal $U_{GS}$ 254 and the state signal $U_{STATE}$ 246. As shown in the depicted example, the $U_{STATE}$ 246 signal is representative of a state of the switch S1 122. In the example, $U_{STATE}$ 246 signal may close a switch coupled to current comparator 258 and activate current comparator 258, and open a switch coupled to voltage comparator 260 and deactivate voltage comparator 260 when $U_{STATE}$ 246 is a logic high. In addition, the $U_{STATE}$ 246 signal may open the switch coupled to current comparator 258 and deactivate current comparator 258, and close the switch coupled to voltage comparator 260 and activate voltage comparator 260 when $U_{STATE}$ signal 246 is a logic low. For example, a logic high $U_{STATE}$ 246 signal may represent the switch S1 122 being closed, and a logic low signal $U_{STATE}$ 246 signal may represent the switch S1 122 being open.

In the example illustrated in FIG. 2B, multifunction signal $U_{MF}$ 228 is also coupled to provide a signal to current comparator 258, and voltage comparator 260 as shown. In one example, controller 236 may convert multifunction signal $U_{MF}$ 228 into a current signal or voltage signal. When high side switch S1 122 is on, there exists a virtual short between the multifunction signal and one end of switch S1 122 as discussed above.

Current comparator 258 determines if a line overvoltage has occurred by measuring the current $I_{MF}$ as expressed above in equation 1. Multifunction signal $U_{MF}$ 228 is coupled to the inverting terminal of current comparator 258, and a current reference $I_{LOV}$ 272 is coupled to the non-inverting terminal of current comparator 258. In one example, the current reference value of $I_{LOV}$ 272 may be representative of 1 milliamp. If multifunction signal $U_{MF}$ 228 is above the current reference value $I_{LOV}$ 272, current comparator 258 outputs a logic high signal $U_{LOVL}$ 248 to the gate drive circuit 250. If multifunction signal $U_{MF}$ 228 is below the current reference value $I_{LOV}$ 272, comparator 258 outputs a logic low signal for $U_{LOVL}$ 248 to the gate drive circuit 250. In one example, the logic high signal $U_{LOVL}$ 248 to the gate drive circuit 250 indicates that a line overvoltage has occurred, and gate drive circuit 250 disables switching of the switch S1 122 in response thereto.

Voltage comparator 260 determines if an output overvoltage has occurred by measuring a voltage signal of $U_{MF}$ 228. Multifunction signal $U_{MF}$ 228 is coupled to the inverting terminal of voltage comparator 260, and a voltage reference $V_{OREF}$ 274 is coupled to the non-inverting terminal of voltage comparator 260. In one example, the value of $V_{OREF}$ 274 may be representative of 2.4 volts. If multifunction signal $U_{MF}$ 228 is above the voltage reference $V_{OREF}$ 274 value, voltage comparator 260 outputs a logic high signal $U_{OOVL}$ 244. If signal $V_{MF}$ 228 is below the voltage reference $V_{OREF}$ 274 value, voltage comparator 260 outputs a logic low signal for $U_{OOVL}$ 244 to the gate drive circuit 250. In one example, the logic high signal $U_{OOVL}$ 244 to the gate drive circuit 250 indicates that an output overvoltage has occurred, and gate drive circuit 250 disables switching of the of switch S1 122 in response thereto.

The example depicted in FIG. 2B also shows that one example of zero current detection circuit 234 includes a first comparator 256, a second comparator 258, a reference comparator 267, a high pass filter 264, and a logic gate 262. In one example, to ensure the buck converter is operating in a critical conduction mode, the gate drive circuit 250 is coupled to immediately turn on switch S1 122 when the inductor L1 120 has been demagnetized. Zero current detection circuit 234 may determine the inductor L1 120 has been demagnetized if the multifunction signal $U_{MF}$ 228 falls below a threshold or exceeds a rate of change.

Zero current detection circuit 234 may determine the input voltage during the on time of switch S1 122. Reference comparator 267 may output a signal to close a switch coupled to the first comparator 256 to activate the first comparator 256, and open a switch coupled to the second comparator 258 to deactivate the second comparator 258. Reference comparator 267 may output a signal to open a switch coupled to the first comparator 256 to deactivate the first comparator 256, and close a switch coupled to the second comparator 258 to activate the second comparator 258. As shown in the depicted example, current reference $I_{REF}$ 266 is coupled to the non-inverting input terminal of reference comparator 267, and multifunction signal $U_{MF}$ 228 is coupled to the inverting input terminal of reference comparator 267. In one example, multifunction signal $U_{MF}$ 228 is converted to a voltage signal for this operation.

If the multifunction signal $U_{MF}$ 228 is above the current reference $I_{REF}$ 266, this may indicate the input voltage is greater than double of the output voltage. In this case, reference comparator 267 closes a switch coupled to first comparator 256, and opens a switch coupled to second comparator 258.

First comparator 256 is coupled to the voltage threshold reference $V_{TH}$ 269 at the inverting input, and the multifunction signal $U_{MF}$ 228 at the non-inverting input. First comparator 256 may determine if multifunction signal $U_{MF}$ 228 falls below the voltage threshold reference $V_{TH}$ 269. In one example, the value of voltage threshold reference $V_{TH}$ 269 may be representative of 0.25 volts. First comparator 256 may output a logic low signal when multifunction signal $U_{MF}$ 228 is above the voltage threshold reference $V_{TH}$ 269 to logic gate 262. First comparator 256 may output a logic high signal when signal $U_{MF}$ 228 is below the voltage threshold reference $V_{TH}$ to logic 262. The output signal $U_{ZCD}$ 242 of the logic gate is coupled to the gate drive circuit 250 to enable controller 236 to switch S1 122.

If the multifunction signal $U_{MF}$ 228 is below the current reference $I_{REF}$ 266, this may indicate the input voltage is not greater than double of the output voltage. In this case, reference comparator 267 opens the switch coupled to first comparator 256, and closes the switch coupled to second comparator 258.

Zero current detection circuit 234 may determine if the multifunction $U_{MF}$ signal 228 exceeds a rate of change. For instance, in the depicted example, second comparator circuit 258 is coupled to receive the multifunction $U_{MF}$ signal 228 at the non-inverting input through a high pass filter 264 coupled to the switch of comparator 258 as shown. Second comparator circuit 258 is also coupled to receive a rate of change threshold signal $V_{DTH}$ 268 at the inverting input as shown to detect a rate change of the multifunction $U_{MF}$ signal 228. In one example, the second comparator 258 utilizes rate of change threshold signal $V_{DTH}$ 268 to detect a rate change of 1V/1 µs of the multifunction $U_{MF}$ 228 signal. If the $U_{MF}$ signal 228 exceeds rate of change threshold signal $V_{DTH}$ 268, second comparator 258 may output a logic high signal to logic gate 262. If the multifunction $U_{MF}$ signal 228 does not exceed rate of change threshold signal $V_{DTH}$ 268, rate change circuit may output a logic low signal to logic gate 262. The output of logic gate 262 outputs the signal $U_{ZCD}$ 242 that is coupled to the gate drive circuit 250 to indicate to controller 236 to switch S1 122 via gate signal $U_{GS}$ 254.

Logic gate 262 is coupled to receive a signal from the first comparator 256 and a signal from second comparator 258. In one example, logic gate 262 is an OR gate. Logic gate 262 outputs a signal to inverter 240, and that inverted signal $U_{ZCD}$ 242 is received by the gate drive circuit 250 to turn on the switch S1 for the next conduction cycle.

Figure 3:
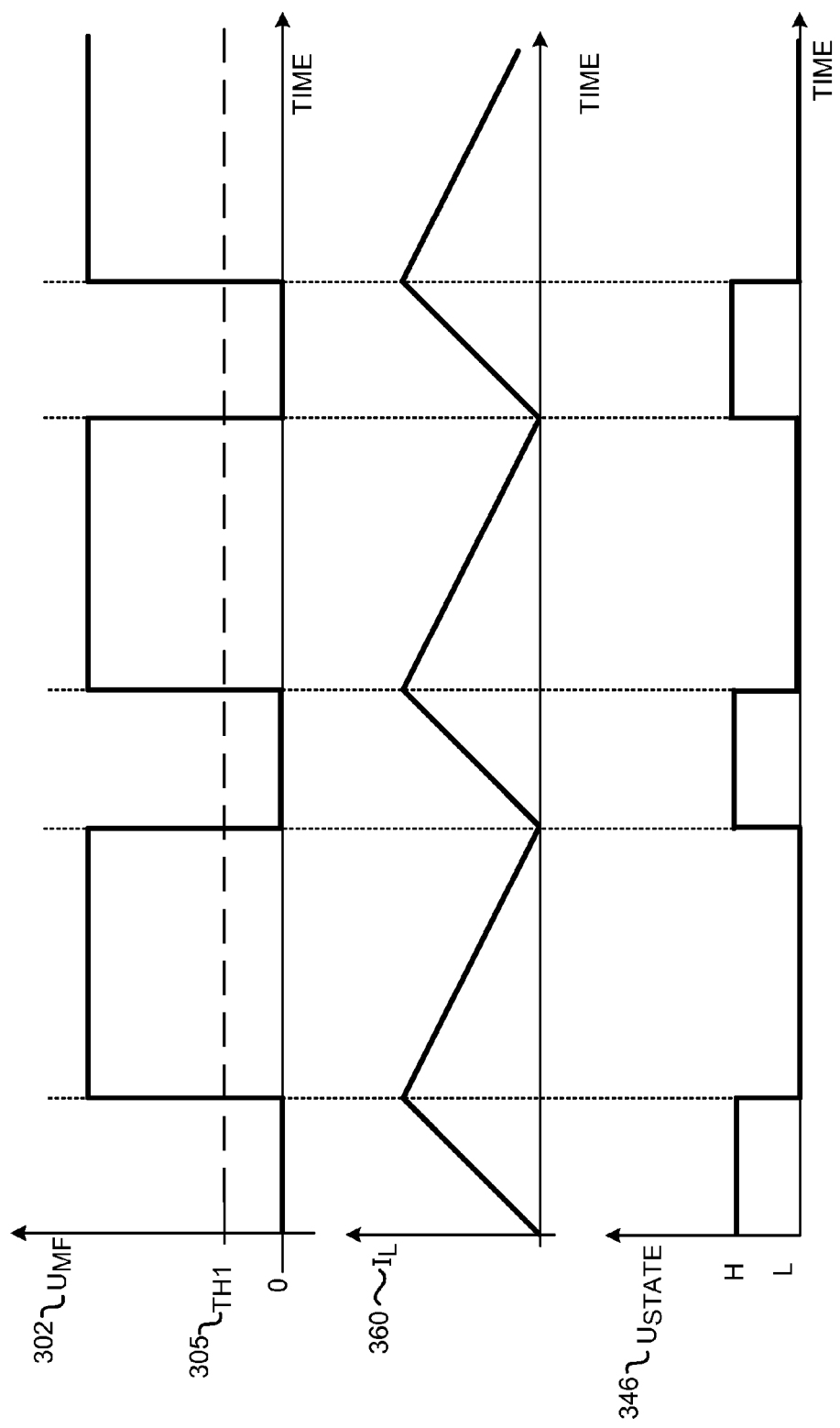
FIG. 3 is an example timing diagram illustrating the voltage at a single terminal that can detect the input voltage and output voltage when the input voltage is above a threshold, in accordance with the teachings of the present disclosure.

FIG. 3 is an example timing diagram illustrating the voltage at a single terminal that can detect the input voltage and output voltage when the input voltage is above a threshold, in accordance with the teachings of the present disclosure. In particular, FIG. 3 illustrates the controller switch S1 based on the multifunction signal $U_{MF}$ 302. In this case, the input voltage is greater than double of the output voltage the operation, and therefore comparator 256 is activated. Multifunction signal $U_{MF}$ 302 may be represented by the waveform. As multifunction signal $U_{MF}$ 302 falls below a threshold value $T_{H1}$ 305, the next switching cycle will begin shortly. The inductor current $I_L$ 360 is represented in FIG. 3. The next switching cycle occurs when inductor current $I_L$ reaches zero current. State signal $U_{STATE}$ 346 represents the current state of the switch. A logic high signal of $U_{STATE}$ 346 represents the switch as closed, and a logic low represents the switch as open. As $U_{STATE}$ 346 switches to a high state, energy in the inductor is stored and inductor current $I_L$ 360 charges linearly. When $U_{STATE}$ 346 switches to a low state, inductor current $I_L$ discharges.

Figure 4:
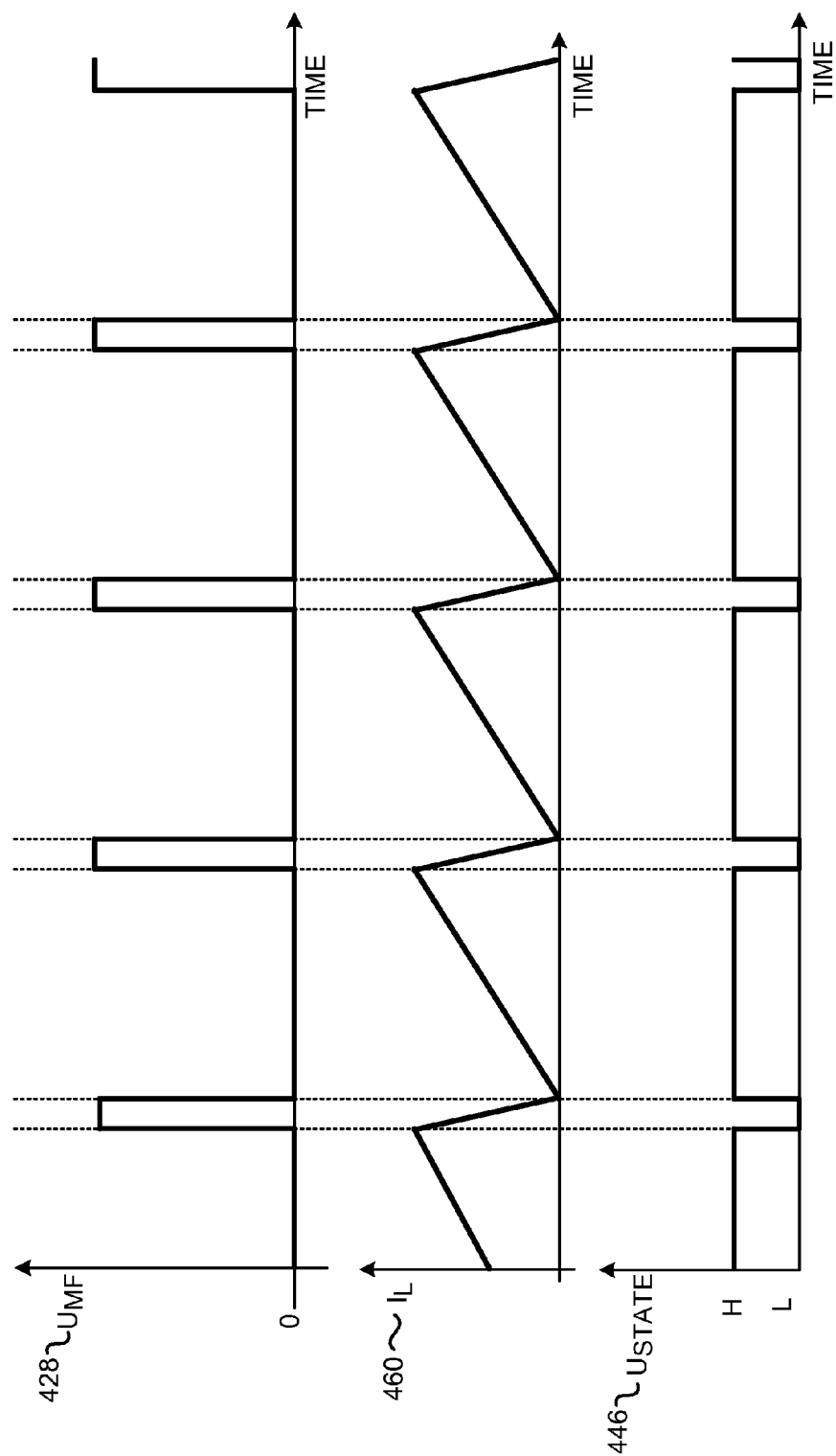
FIG. 4 is another example timing diagram illustrating the voltage at a single terminal that can detect the input voltage and output voltage when the input voltage is below a threshold, in accordance with the teachings of the present disclosure.

FIG. 4 is an example timing diagram illustrating the voltage at a single terminal that can detect the input voltage and output voltage when the input voltage is below a threshold, in accordance with the teachings of the present disclosure. In particular, FIG. 4 illustrates the controller switching based on the multifunction signal $U_{MF}$ 428 when the input voltage is less than double of the output voltage. As multifunction signal $U_{MF}$ 428 falls greater than a rate change, the next switching cycle will begin shortly. The inductor current of L1 460 may discharge at a rate faster than the rate shown in FIG. 3. State signal $U_{STATE}$ 446 represents the current state of the switch. A logic high signal of $U_{STATE}$ 446 represents the switch as closed, and a logic low represents the switch as open. As $U_{STATE}$ 446 switches to a high state, inductor current $I_L$ 460 charges.

Figure 5:
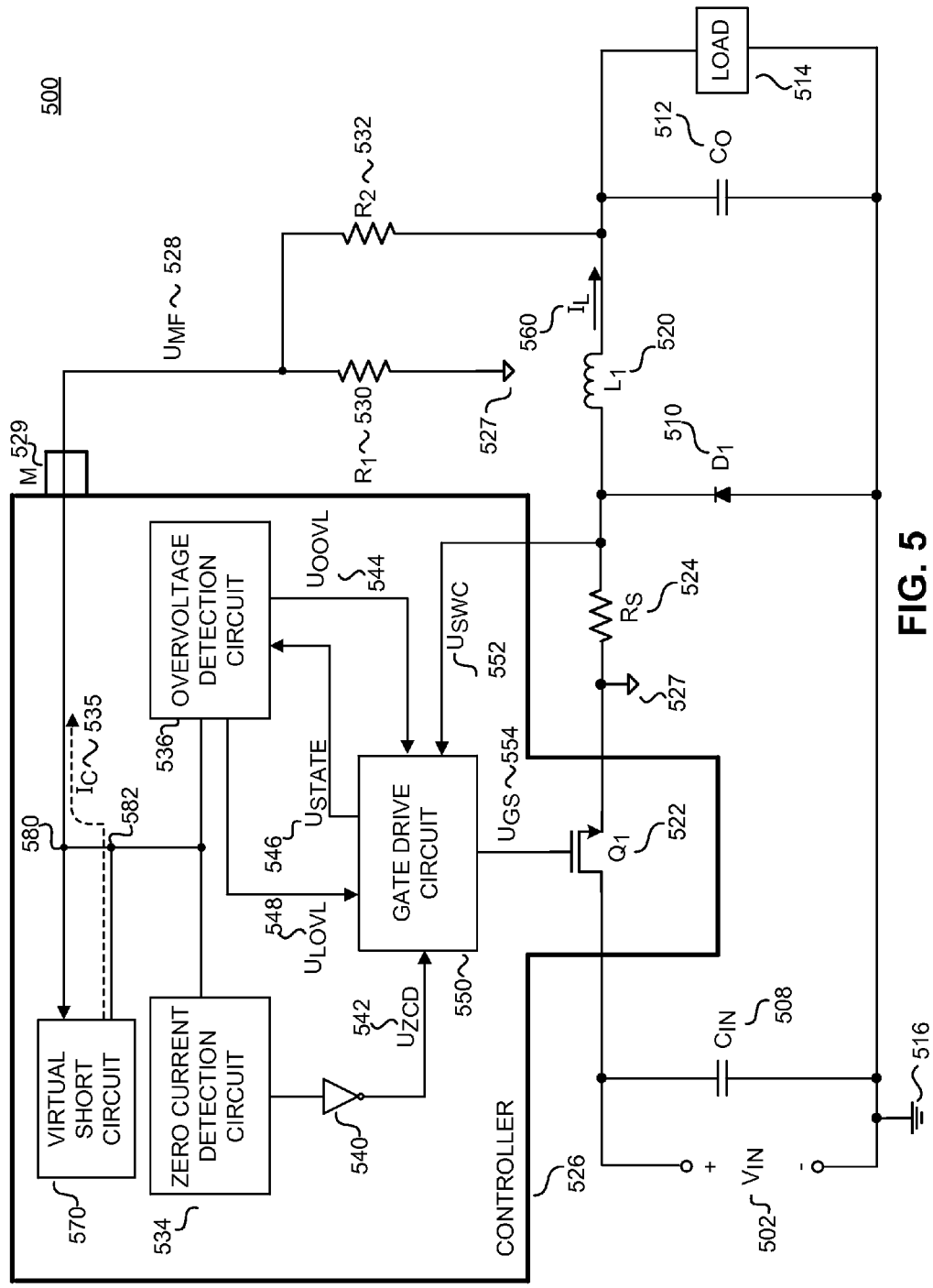
FIG. 5 is a block diagram illustrating another example of a power converter, in accordance with the teachings of the present disclosure.

FIG. 5 is a block diagram illustrating another example of a power converter 500, in accordance with the teachings of the present disclosure. It is appreciated that the example power converter 500 illustrated in FIG. 5 is similar to power converter 100 illustrated in FIG. 1, except that switch S1 122 has been replaced by a switch Q1 522. In one example, the switch Q1 522 is an n-channel MOSFET. In this example, the switch Q1 is included in a monolithic package including the controller of 526. In one example, switch of Q1 522 may also be a discrete switch. The operation of power converter 500 as described in FIGS. 1-4 remains the same.

Figure 6:
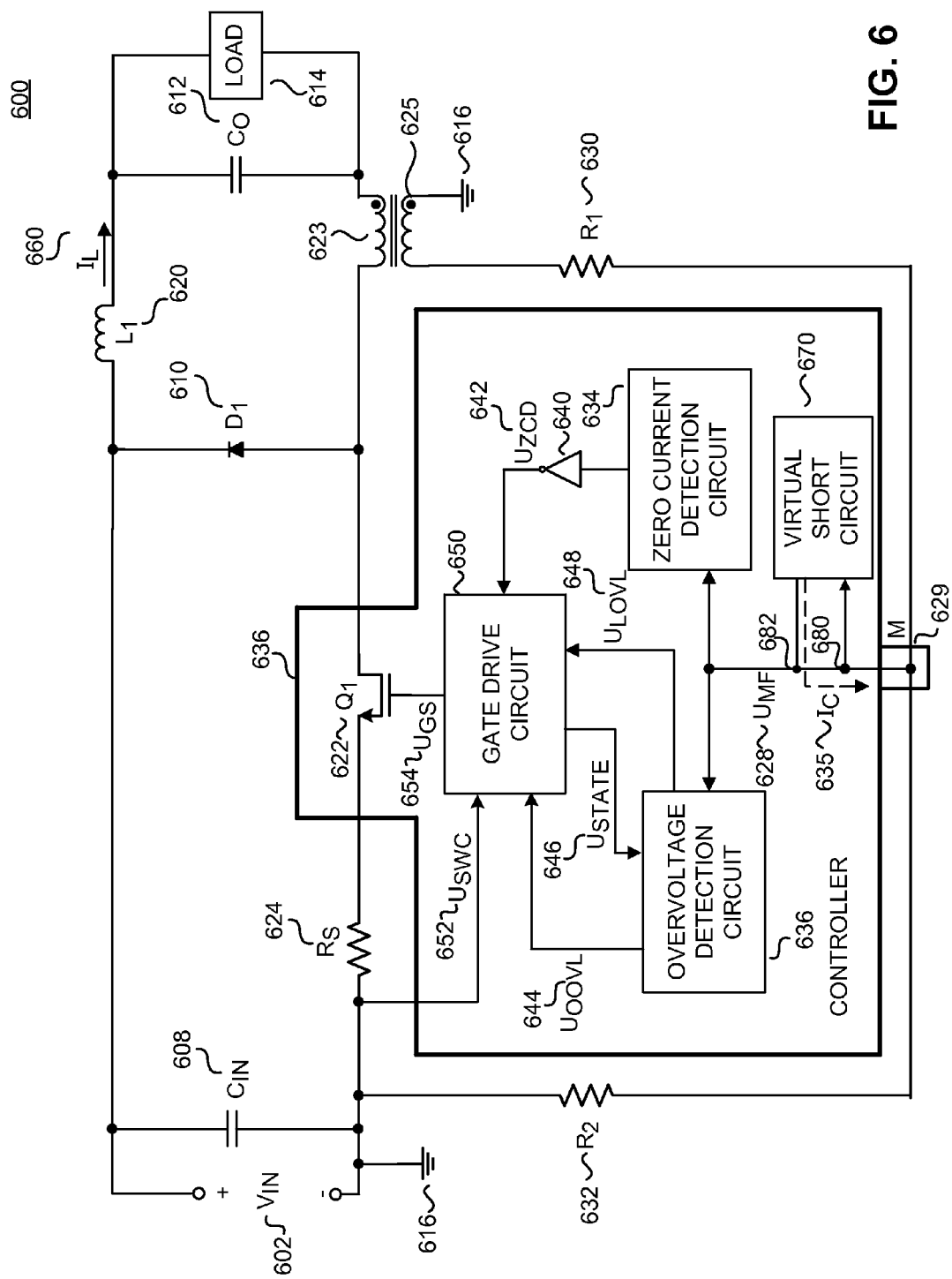
FIG. 6 is a block diagram illustrating yet another example of a power converter, in accordance with the teachings of the present disclosure.

FIG. 6 is a block diagram illustrating yet another example of a power converter 600, in accordance with the teachings of the present disclosure. It is appreciated that the example power converter 600 illustrated in FIG. 6 is similar to power converter 500 illustrated in FIG. 5, except that controller 636 has been moved to the low side. As shown in the depicted example, power converter 600 further includes an auxiliary winding of energy transfer element including a primary winding 623 and a secondary winding 625. The secondary winding 625 is further coupled to a local return 616, which provides the multifunction signal $U_{MF}$ 628 to controller 636. Primary winding is used to block a continuous DC error voltage that appears across the multifunction pin 629. The operation of power converter 600 as described in FIGS. 1-4 remains the same.

Figure 7:
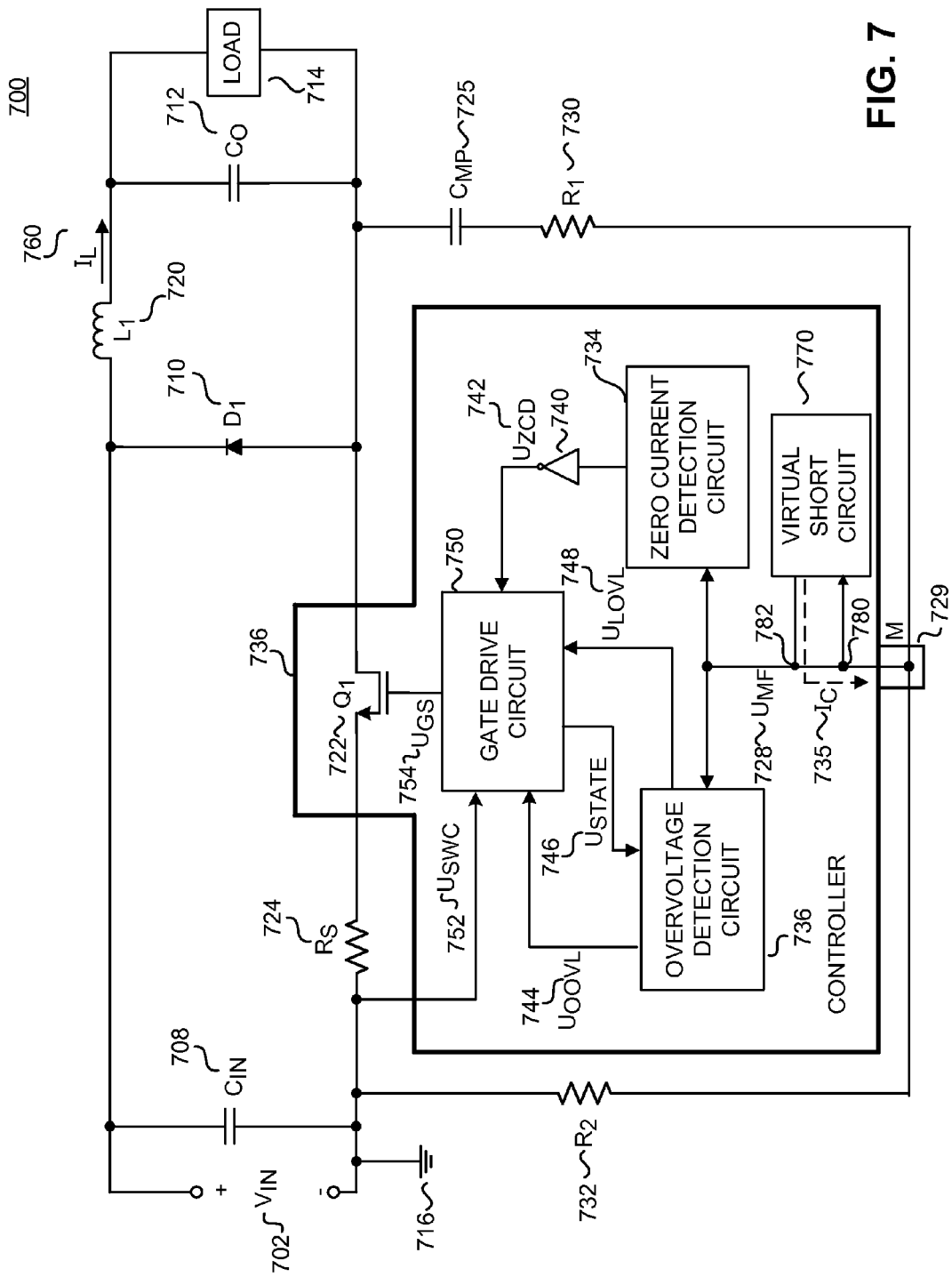
FIG. 7 is a block diagram illustrating still another example of a power converter, in accordance with the teachings of the present disclosure.

FIG. 7 is a block diagram illustrating still another example of a power converter 700, in accordance with the teachings of the present disclosure. It is appreciated that the example power converter 700 illustrated in FIG. 7 is similar to power converter 600 illustrated in FIG. 6, except that instead of an auxiliary winding of energy transfer element including a primary winding 623 and a secondary winding 625, a blocking capacitor 725 is substituted. The waveform sensed by the divider network is equivalent to an ac voltage across inductor L1 720. The operation of power converter 700 as described in FIGS. 1-4 remains the same.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for use in a power converter, comprising:
    a gate drive circuit coupled to generate a control signal to switch a power switch of the power converter to control a transfer of energy of from an input of the power converter through an energy transfer element to an output of the power converter;
    a zero current detection circuit coupled to a multifunction pin coupled to receive a multifunction signal from the power converter, wherein the multifunction signal is representative of an input voltage of the power converter when the power switch is on, and wherein the multifunction signal is representative of an output voltage of the power converter when the power switch is off, wherein the zero current detection circuit is coupled to generate in response to the multifunction signal a zero current detection signal coupled to be received by the gate drive circuit; and
    an overvoltage detection circuit coupled to the multifunction pin to receive the multifunction signal from the power converter, wherein the overvoltage detection circuit is further coupled to the gate drive circuit to receive a state signal representative of a state of the power switch, wherein the overvoltage detection circuit is coupled to generate in response to the state signal and the multifunction signal a line overvoltage signal and an output overvoltage signal coupled to be received by the gate drive circuit, wherein the gate drive circuit is coupled to disable switching of the power switch in response to the output overvoltage signal or the line overvoltage signal.

2. The controller of claim 1, further comprising a virtual short circuit coupled to the multifunction pin, wherein the virtual short circuit is coupled to provide a virtual short circuit current to the multifunction pin in response to the multifunction signal decreasing to a negative value.

3. The controller of claim 2, wherein the virtual short circuit comprises:
    a ground sense amplifier having a first input coupled to the multifunction pin to receive the multifunction signal, and a second input coupled to a ground reference; and
    a current source coupled to provide the virtual short circuit current to the multifunction pin in response to an output of the ground sense amplifier.

4. The controller of claim 1, wherein the zero current detection circuit comprises:
    a reference comparator having a first input coupled to the multifunction pin to receive the multifunction signal, and a second input coupled to a voltage reference;
    a first comparator coupled to be activated or deactivated in response to an output of the reference comparator to compare the multifunction signal with a voltage threshold reference;
    a second comparator coupled to be deactivated or activated in response to the output of the reference comparator to compare the multifunction signal with a rate of change threshold signal; and
    a logic gate having a first input coupled to an output of the first comparator, and a second input coupled to an output of the second comparator, wherein the logic gate is coupled to generate the zero current detection signal in response to the first comparator and the second comparator.

5. The controller of claim 4, wherein the zero current detection circuit further comprises a high pass filter, wherein the second comparator is coupled to receive the multifunction signal through the high pass filter when the second comparator is activated.

6. The controller of claim 1, wherein the overvoltage detection circuit comprises:
    a third comparator coupled to be activated or deactivated in response to the state signal to compare the multifunction signal with a line overvoltage current reference to generate the line overvoltage signal;
    a fourth comparator coupled to be deactivated or activated in response to the state signal to compare the multifunction signal with a overvoltage reference to generate the output overvoltage signal.

7. The controller of claim 1, wherein the power switch is included in the controller.

8. The controller of claim 1, wherein the power converter is a buck converter.

9. The controller of claim 8, wherein the power switch is a high side switch of the buck converter.

10. The controller of claim 8, wherein the power switch is a low side switch of the buck converter.

11. The controller of claim 1, wherein the multifunction signal is coupled to be received from through a first resistor having a first end coupled to the multifunction pin, and a second end coupled to be responsive to the output of the power converter, wherein a second resistor is coupled between the multifunction pin and a local return.

12. A power converter, comprising:
    an energy transfer element coupled between an input of the power converter and an output of the power converter;
    a power switch coupled to the input of the power converter and the energy transfer element; and
    a controller, wherein the controller includes:
        a gate drive circuit coupled to generate a control signal to switch the power switch to control a transfer of energy of from the input of the power converter through the energy transfer element to the output of the power converter;
        a zero current detection circuit coupled to a multifunction pin coupled to receive a multifunction signal of the power converter, wherein the multifunction signal is representative of an input voltage of the power converter when the power switch is on, and wherein the multifunction signal is representative of an output voltage of the power converter when the power switch is off, wherein the zero current detection circuit is coupled to generate in response to the multifunction signal a zero current detection signal coupled to be received by the gate drive circuit; and
        an overvoltage detection circuit coupled to the multifunction pin to receive the multifunction signal from the power converter, wherein the overvoltage detection circuit is further coupled to the gate drive circuit to receive a state signal representative of a state of the power switch, wherein the overvoltage detection circuit is coupled to generate in response to the state signal and the multifunction signal a line overvoltage signal and an output over voltage signal coupled to be received by the gate drive circuit, wherein the gate drive circuit is coupled to disable switching of the power switch in response to the output overvoltage signal or the line overvoltage signal.

13. The power converter of claim 12, wherein the controller further comprises a virtual short circuit coupled to the multifunction pin, wherein the virtual short circuit is coupled to provide a virtual short circuit current to the multifunction pin in response to the multifunction signal decreasing to a negative value.

14. The power converter of claim 13, wherein the virtual short circuit comprises:
a ground sense amplifier having a first input coupled to the multifunction pin to receive the multifunction signal, and a second input coupled to a ground reference; and
a current source coupled to provide the virtual short circuit current to the multifunction pin in response to an output of the ground sense amplifier.

15. The power converter of claim 12, wherein the zero current detection circuit comprises:
a reference comparator having a first input coupled to the multifunction pin to receive the multifunction signal, and a second input coupled to a voltage reference;
a first comparator coupled to be activated or deactivated in response to an output of the reference comparator to compare the multifunction signal with a voltage threshold reference;
a second comparator coupled to be deactivated or activated in response to the output of the reference comparator to compare the multifunction signal with a rate of change threshold signal; and
a logic gate having a first input coupled to an output of the first comparator, and a second input coupled to an output of the second comparator, wherein the logic gate is coupled to generate the zero current detection signal in response to the first comparator and the second comparator.

16. The power converter of claim 15, wherein the zero current detection circuit further comprises a high pass filter, wherein the second comparator is coupled to receive the multifunction signal through the high pass filter when the second comparator is activated.

17. The power converter of claim 12, wherein the overvoltage detection circuit comprises:
a third comparator coupled to be activated or deactivated in response to the state signal to compare the multifunction signal with a line overvoltage current reference to generate the line overvoltage signal;
a fourth comparator coupled to be deactivated or activated in response to the state signal to compare the multifunction signal with a overvoltage reference to generate the output overvoltage signal.

18. The power converter of claim 12, wherein the power switch is included in the controller.

19. The power converter of claim 12, wherein the power converter is a buck converter.

20. The power converter of claim 12, further comprising:
a first resistor having a first end coupled to the multifunction pin, and a second end coupled to be responsive to the output of the power converter, wherein the multifunction pin is coupled to receive the multifunction signal through the first resistor; and
a second resistor is coupled between the multifunction pin and a local return.

* * * * *